March 17, 1959     N. A. CRITES     2,878,012

BELLOWS DAMPER

Filed July 15, 1954

INVENTOR.
Nelson A. Crites

BY *Gray, Mase & Dunson*
ATTORNEYS.

United States Patent Office 2,878,012
Patented Mar. 17, 1959

2,878,012

BELLOWS DAMPER

Nelson A. Crites, Columbus, Ohio, assignor, by mesne assignments, to Rockwell-Standard Corporation, Coraopolis, Pa., a corporation of Pennsylvania Application July 15, 1954, Serial No. 443,600

1 Claim. (Cl. 267—1)

This invention relates to cushions having a bellows damper. More specifically, it relates to a bellows damper for springs which may be vertically compressed with substantially no radial displacement.

Cushions having the bellows damper of this invention are particularly suitable for use in automobiles, or other like vehicles. The primary disadvantage of the spring-type constructed automobile cushions is the quick rebounding action and subsequent counterrebounding actions which continue long after the initial shock has been sustained by the cushion. This rebounding oscillatory movement is often responsible for the motion sickness experienced by many automobile passengers. Various means, such as air compartments, have been proposed to limit this oscillatory movement of the spring. In general, the function of the air compartment is to provide a partial vacuum which tends to retard or snub the rebounding motion of the spring after release of the compressive force. An example of such an air-compartment device is shown in British Patent 225,225, dated May 14, 1926, wherein a spring is enclosed in a wrapper of elastic or yieldable airtight material. Upon compression, the elastic or yieldable material expands or folds outwardly, thus initially causing an outward volume displacement before the air begins to be forced out through an air-expulsion opening in the compartment. After release of the compressive force, the spring starts to return to its normal position, and the wrapper material collapses inwardly. Due to the wrapper material moving outwardly and inwardly, causing the volume displacement, the partial vacuum in the air compartment is not realized until the spring has traveled some distance in its return travel. Hence, a smooth and even retarding or snubbing action is not obtained. Furthermore, subsequent rebounding is not retarded or snubbed unless the amount of compression is sufficient to overcome the initial outward volume displacement resulting from the outward movement of the wrapper material. In addition, it is apparent that this air compartment serves no useful function when the spring is subjected to small amounts of compression.

It, therefore, is an object of this invention to provide a bellows-type cushion construction which will absorb the shock of uneven travel, rebound to its normal position, but have a minimum amount of counterrebounding oscillatory movement.

It is a further object of this invention to provide a bellows damper which quickly registers a change in volume to thereby provide a partial vacuum immediately available for snubbing or retarding the counterrebounding movements of the spring.

It is a further object of this invention to provide a bellows damper which may be vertically compressed but which has substantially no radial expansion upon vertical compression.

More specifically, it is an object of this invention to provide a bellows structure having side walls of an air-impermeable, flexible material suitably reinforced so as to prevent radial displacement when the bellows damper is vertically compressed.

These, and other objects and advantages of the present invention will become more apparent from the following detailed description and drawings.

Figure 1:
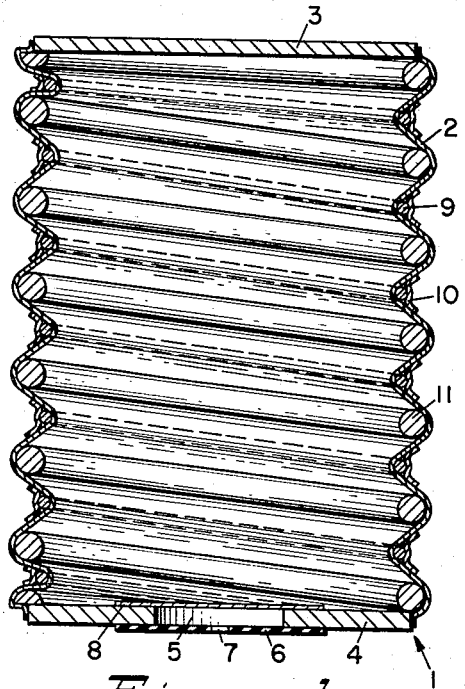
Fig. 1 is a cross-sectional view of the bellows damper and spring.
Figure 2:
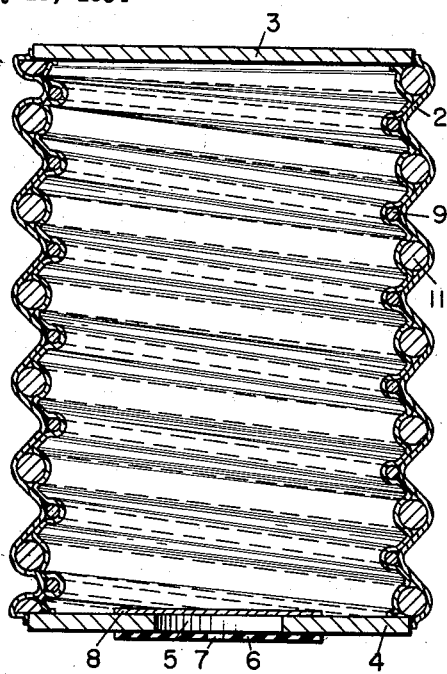
Fig. 2 is a cross-sectional view of an integrally constructed bellows and spring.

The bellows damper and spring is designated generally by the numeral 1 in the drawings. The bellows damper includes an air-impermeable, collapsible or flexible side wall 2. The ends of the side wall are enclosed by top and bottom members 3 and 4, respectively. The junctures at the ends of the side wall and the enclosing members are made airtight in any suitable manner. For example, a sealing tape or compound may be used to seal these junctures. The bellows is provided with passageways for the leakage of air in and out of the chamber formed by the enclosed side wall. As shown in Figs. 1 and 2, the air-leak passages are located in the bottom enclosing member 4. The air-leak passages shown in Figs. 1 and 2 consist of an aperture 5 covered by a flap valve 6 which in turn contains an opening 7. The opening 7 communicates with the aperture 5 when the flap valve is in its closed position. The aperture 5 also may be covered with a loosely woven fabric member 8. The function of the member 8 is to prevent any whistling or similar noise caused by the passage of air through the aperture.

Referring to Fig. 1, reinforcing members 9 are shown as being located on the outside surface of the side wall 2 positioned to reinforce the side wall at points intermediate the coils of the spring. These reinforcing members 9 are held in place by the tape 10 which is attached to the side wall 2. This tape may be sewed onto the side wall or bonded thereto. As shown in Fig. 1, the spring 11 is positioned in the bellows. The edges of the spring are in actual or approximate contact with the inner surface of the side wall 2.

When a compressive force is applied, the spring, of course, compresses. The bellows then collapses or folds together, compressing the air in the bellows chamber. The reinforcing members 9 then prevent the bellows side wall from billowing or ballooning outwardly. In this manner, outward radial volume displacement of the air is restrained, thereby providing a confined path for the expulsion of the air through the air-leak passages. Referring to Fig. 1, as the air is compressed, the flap valve 6 is forced open, permitting the air to pass through the aperture 5. When the compressive force has reached its peak, the flap valve 6 snaps shut over the aperture 5. Upon release of the compressive force the spring begins to rebound to its normal position. However, a partial vacuum is formed within the bellows chamber which acts to retard or snub the rebounding movement of the spring. This partial vacuum occurs almost immediately since the side wall of the bellows has been restrained from outward radial displacement and now is also restrained from collapsing inwardly. The partial vacuum is overcome by air passing through the opening 7 in the valve 6. The rate at which the partial vacuum is overcome and, hence, the rate at which the rebounding movement of the spring is snubbed, is limited in accordance with the amount of air allowed to flow back into the bellows chamber through the opening 7 in the valve 6.

Fig. 2 shows a bellows construction having the spring and restraining ribs integral with the side wall of the bellows. Specifically, the side wall 2 may consist of two layers of an air-impermeable, flexible material. The spring 11 and the reinforcing ribs 9 are interposed between the two layers of the side-wall material. The two layers are then bonded together. In this manner, an integral spring-bellows damper structure is obtained.

Figure 3:
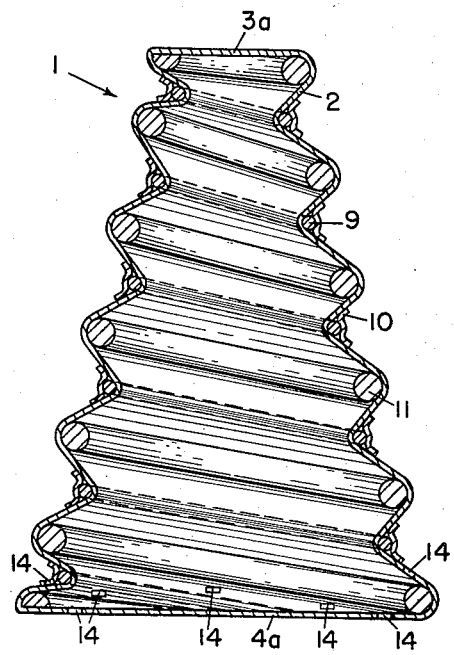
Fig. 3 is a cross-sectional view of a modified form of the bellows damper and spring.

Fig. 3 sets forth a modified form of the bellows damper in conjunction with a conically shaped coil spring. The bellows damper includes a side wall 2 of an air-impermeable, collapsible or flexible material covering the conically shaped coil spring 11. The ends of the side wall may be suitably enclosed by the top and bottom members 3 and 4, as previously explained. In the modification of Fig. 3, the top and bottom members 3a and 4a are shown to be made of the same material as the side wall 2. The reinforcing members 9 are positioned to reinforce the side wall at points intermediate the coils of the spring and are held in place on the side wall by the tape 10. The air-leak passages in this form of the bellows damper consist of one or more orifices 14 in the bellows. These orifices conveniently may be formed by the hog-rings used to hold the coil spring in position in the cushion. Upon compression, the air is expelled through the orifices 14. The partial vacuum formed during release of the compressive force is overcome by the air which leaks back through the orifices 14. One of the advantages of the conically shaped coil spring is that it may be compressed to a greater degree than the conventional cylindrically shaped coil spring. That is, the conical form permits the coils to be compressed without coming into contact with each other.

Figure 4:
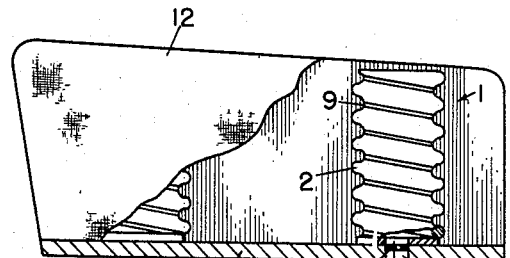
Fig. 4 is a side elevation, partly broken away, of a cushion incorporating the bellows damper of this invention.

A seat cushion incorporating a bellows-dampened spring of this invention is shown in Fig. 4. The bellows damper and spring are supported upon a cushion frame 15 with the top portion of the bellows and spring resting against the underside of the load surface 12 of the cushion. The frame member 15 has an opening 13 in register with the valve 6 of the bellows to permit free motion of the valve and provide a passageway for the air.

The side wall 2 may be constructed from any suitable flexible and air-impermeable material. A suitable material, for example, is rubber-impregnated or rubber-coated fabric. Paper or plastic compositions which are nonporous and flexible also may be used. The restraining members 9 may be of metal or other nonelastic material such as plastic. Ribs of cloth fabric sewed or bonded to the side wall also may be used to restrain the bellows side wall from radial volume displacement.

In summary, it is seen that the bellows damper of this invention provides a partial vacuum which is quickly available for retarding the rebounding oscillatory motion of springs. Due to the prevention of radial volume displacement in the bellows, the partial vacuum occurs even in cases where the spring is slightly compressed. Thus, even the small vibratory oscillatory movement of the springs is retarded. Although the above description describes specific embodiments of the invention, it will be obvious to those skilled in the art that various modifications may be made in the general arrangement and details of the various elements of the device without departing from the spirit and scope of the invention.

What is claimed is:

A bellows-damped load-supporting spring unit comprising: a pair of helical coil-spring elements having geometrically similar helical form and disposed with their longitudinal axes concentrically positioned; one of said elements being formed in a diametrically smaller helix than the other and positioned within the other; a bellows encasing and supported by said spring elements, said bellows comprising a plurality of casing members, including at least one continuous air-impermeable casing member connected alternately between adjacent portions of said spring elements and in contiguous supporting relation thereto, said spring elements being held in contiguous supporting relation to said at least one continuous casing member by at least one other of said casing members wrapped partially around said spring elements and fastened to said continuous member; closure means at opposite ends of said spring unit hermetically fastened to said bellows; at least one of said closure means having a valve therein actuated to open position by super-atmospheric pressure within said bellows and to closed position by subatmospheric pressure within said bellows, said valve having an opening therein providing limited communication between said bellows and the atmosphere at all times; said coil spring elements serving to support said load and at the same time restrain both inward and outward radial displacement of said casing members.

References Cited in the file of this patent

UNITED STATES PATENTS

| | | |
|---|---|---|
| 84,258 | Bussell | Nov. 24, 1868 |
| 1,602,079 | Kraft | Oct. 5, 1926 |
| 1,928,526 | Fellabaum | Sept. 26, 1933 |
| 2,056,106 | Kuhn | Sept. 29, 1936 |
| 2,192,355 | Kuhn | Mar. 5, 1940 |

FOREIGN PATENTS

| | | |
|---|---|---|
| 259,603 | Great Britain | June 2, 1927 |
| 648,562 | Great Britain | Jan. 10, 1951 |
| 825,642 | Germany | Dec. 20, 1951 |